Patented Jan. 2, 1945

2,366,327

UNITED STATES PATENT OFFICE 2,366,327

POLYMERIZATION OF BUTADIENES-1,3

Charles F. Fryling, Silver Lake, Ohio, assignor to The B. F. Goodrich Company, New York, N. Y., a corporation of New York No Drawing. Application December 26, 1940, Serial No. 371,785

10 Claims. (Cl. 260—84.5)

This invention relates to the polymerization of butadienes-1,3 and particularly to a method whereby butadienes-1,3 may be polymerized in aqueous emulsion to yield synthetic rubbers of increased solubility which may be readily fabricated into vulcanized articles of high quality.

The emulsion polymerization of butadienes-1,3 either alone or in admixture with other butadienes-1,3 or with other unsaturated compounds copolymerizable therewith known as co-monomers to form compositions of matter more or less resembling crude rubber is well known. The solubility and workability of synthetic rubbers may be increased by effecting the polymerization in the presence of certain sulfur-containing compounds called "modifiers." When conjugated enines are present during the emulsion polymerization of butadienes-1,3, however, insoluble materials are usually obtained, which products are very difficult to process and yield vulcanizates possessing inferior tensile strengths and low ultimate elongations.

I have now discovered that superior synthetic rubbers are obtained by the polymerization of an aqueous emulsion comprising a butadiene-1,3 and a modifier, if a small amount, but less than about one mol. percent based on the amount of polymerizable material in the emulsion, of a conjugated enine is present during the polymerization. Conjugated enines are materials containing an acetylenic triple bond and an olefinic double bond in conjugated relationship, all of which contain the carbon skeleton

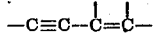

To illustrate the advantages obtainable by employing the method of this invention, an aqueous emulsion containing 7.5 gm. of butadiene, 2.5 gm. of acrylonitrile, .035 gm. of hydrogen peroxide, 25 cc. of a 2% solution of myristic acid which had been 85% neutralized with sodium hydroxide, and .04 gm. of the modifier diisopropyl dixanthogen was agitated in a glass polymerization tube at 30° C. After 35 hrs. the latex was removed from the tube and coagulated to give a plastic, coherent product 58% soluble in benzene. When the above experiment was repeated with the incorporation of .04 gm. of vinyl acetylene in the emulsion, a plastic, coherent product 91% soluble in benzene was obtained, while the incorporation of .08 gm. yielded a plastic, coherent product 67% soluble in benzene. The use of proportions of vinyl acetylene much greater than .1 gm., however, adversely affected the properties of the product in the characteristic manner in which the presence of vinyl acetylene affects the properties of polymers prepared in the absence of any modifier. Thus the use of .12 gm. of vinyl acetylene produced a polymer of markedly reduced plasticity which was only 25% soluble in benzene, and the use of .20 gm. of vinyl acetylene produced a non-plastic, non-coherent polymer which was very difficult to subject to processing operations, and which produced vulcanizates having low tensile strength and ultimate elongation.

Other conjugated enines may be employed in place of the vinyl acetylene. Thus divinyl acetylene, which is the trimer of acetylene, may be employed, or the tetramer of acetylene believed to be 1,5,7 octatriene-3-yne may be incorporated in polymerization batches in proportions smaller than about one mol. percent based on the amount of monomer present.

The method of this invention may be adapted to the emulsion polymerization of any butadiene-1,3 hydrocarbon including unsubstituted butadiene-1,3 itself (commonly termed butadiene) and also its hydrocarbon homologs such as 2,3-dimethyl butadiene-1,3, isoprene and piperylene, either alone or in admixture with each other or with other unsaturated compounds copolymerizable therewith. A number of materials which contain the group

wherein the free valences are attached to different groups and which are believed to enter into polymeric chains only by 1,2-addition are known to be capable of copolymerizing with butadienes-1,3. This class of compounds, herein called comonomers, includes such compounds as styrene, vinyl naphthalene, methacrylonitrile, methyl methacrylate, vinyl acetate, vinylidene chloride, methyl vinyl ketone, methyl vinyl ether, and similar unsaturated hydrocarbons, nitriles, esters, ketones, and ethers. These comonomers are preferably, though not necessarily, employed in smaller amounts than the conjugated diene.

Any of the well-known modifiers for polymerizations of butadienes-1,3 such as those disclosed in British Patents Nos. 497,420, 497,638, and 497,706 and French Patent No. 834,466 may be employed. The successful practice of this invention is not dependent upon the use of any particular modifier, but the vinyl acetylene or other conjugated enine must be employed in conjunction with some material having a modifying action to obtain the improvement in the properties of the polymer. The dialkyl dixanthogens disclosed in the above-cited French patent constitute a particularly useful type of modifier.

The polymerization may be effected by various catalysts such as per-compounds including hydrogen peroxide, ammonium persulfate, potassium persulfate, and other peroxides, persulfates, perborates, percarbonates, and the like, diazoaminobenzene, and dipotassium diazomethane disulfonate.

Any of the ordinary emulsifying agents such as fatty acid soaps, hymolal sulfates or sulfonates, salts of certain organic bases such as the hydrochloride of diethylaminoethyloleylamide, etc., may be employed to effect the emulsion of the monomers in water.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing in aqueous emulsion a butadiene-1,3 hydrocarbon in the presence of a dialkyl dixanthogen and a small amount, less than one mol. percent based on the amount of polymerizable material present in the emulsion, of a conjugated enine.

2. The method which comprises copolymerizing in aqueous emulsion butadiene-1,3 and a smaller amount of a compound which contains a

group and is copolymerizable therewith in aqueous emulsion in the presence of a dialkyl dixanthogen and a small amount, less than about one mol. percent based on the amount of polymerizable material in the emulsion, of vinyl acetylene.

3. The method which comprises copolymerizing in aqueous emulsion butadiene-1,3 and a smaller amount of a compound which contains a

group and is copolymerizable therewith in aqueous emulsion, in the presence of a dialkyl dixanthogen and a small amount, less than about one mol. percent based on the amount of polymerizable material present in the emulsion, of a conjugated enine.

4. The method which comprises polymerizing an aqueous emulsion comprising butadiene-1,3 in the presence of a dialkyl dixanthogen and a small amount, less than about one mol. percent based on the amount of polymerizable material in the emulsion, of vinyl acetylene.

5. The method which comprises copolymerizing butadiene-1,3 with a smaller amount of acrylonitrile in an aqueous emulsion in the presence of a dialkyl dixanthogen and about 0.4 mol. percent based on the amount of polymerizable material in the emulsion, of vinyl acetylene.

6. A composition of matter obtained by the method of claim 1.

7. A composition of matter obtained by the method of claim 2.

8. A composition of matter obtained by the method of claim 3.

9. A composition of matter obtained by the method of claim 4.

10. A composition of matter obtained by the method of claim 5.

CHARLES F. FRYLING.